United States Patent
Dickinson et al.

(10) Patent No.: US 11,577,666 B2
(45) Date of Patent: Feb. 14, 2023

(54) ARROWHEAD FASTENER CLIP WITH BARBS

(71) Applicant: Termax LLC, Lake Zurich, IL (US)

(72) Inventors: Daniel James Dickinson, Lincolnshire, IL (US); David Friesorger, Lakemoor, IL (US)

(73) Assignee: TERMAX LLC, Lake Zurich, IL (US)

( * ) Notice: Subject to any disclaimer, the term of this patent is extended or adjusted under 35 U.S.C. 154(b) by 23 days.

(21) Appl. No.: 16/925,234

(22) Filed: Jul. 9, 2020

(65) Prior Publication Data
US 2020/0339044 A1 Oct. 29, 2020

Related U.S. Application Data (63) Continuation-in-part of application No. 16/739,111, filed on Jan. 9, 2020, now Pat. No. 11,440,486, which is a continuation-in-part of application No. 14/147,522, filed on Jan. 4, 2014, which is a continuation-in-part of application No. 13/476,957, filed on May 21, 2012, now abandoned, application No. 16/925,234, filed on Jul. 9, 2020, which is a continuation-in-part of application No. 14/806,651, filed on Jul. 23, 2015, now abandoned.

(60) Provisional application No. 62/888,433, filed on Aug. 16, 2019, provisional application No. 62/891,419, filed on Aug. 25, 2019.

(51) Int. Cl.
*F16B 5/06* (2006.01)
*B60R 13/02* (2006.01)
*F16B 21/07* (2006.01)

(52) U.S. Cl.
CPC .......... *B60R 13/0206* (2013.01); *F16B 5/065* (2013.01); *F16B 21/075* (2013.01)

(58) Field of Classification Search
CPC ..... B60R 13/0206; B60R 13/04; F16B 5/065; F16B 21/075; Y10T 24/44026
See application file for complete search history.

(56) References Cited

U.S. PATENT DOCUMENTS

| | | | | |
|---|---|---|---|---|
| 4,402,118 A * | 9/1983 | Benedetti | ................ | F16B 5/065 24/289 |
| 5,533,237 A * | 7/1996 | Higgins | .................. | F16B 5/065 24/289 |
| 6,074,150 A * | 6/2000 | Shinozaki | ........... | B60R 13/0206 24/297 |
| 6,449,814 B1 * | 9/2002 | Dinsmore | ............... | F16B 5/065 24/289 |
| 6,527,471 B2 * | 3/2003 | Smith | ....................... | F16B 2/20 403/291 |

(Continued)

*Primary Examiner* — Robert Sandy
*Assistant Examiner* — Michael S Lee (57) ABSTRACT

A system and method including a fastener clip, the fastener clip including one or more pairs of laterally offset legs joined at a head portion. The legs form a clip opening at an opposite end of the head portion. The fastener clip also includes a pair of arms coupled to the head portion, the arms being configured to move substantially independently from the pair of legs. The fastener clip also includes a pair of projections each attached at the ends of each of the arms. The projections are configured to engage an opening of a blade over which the fastener clip is configured to be coupled to the blade at least based upon the fastener clip being placed over the blade.

8 Claims, 6 Drawing Sheets

(56) References Cited

U.S. PATENT DOCUMENTS

| | | | | |
|---|---|---|---|---|
| 7,287,945 B2* | 10/2007 | Lubera | ................... | F16B 5/065 24/295 |
| 7,428,770 B2* | 9/2008 | Dickenson | ........... | F16B 5/0614 24/289 |
| 7,444,721 B2* | 11/2008 | Smith | ................ | B60R 13/0206 24/297 |
| 2005/0000063 A1* | 1/2005 | De Azevedo | ......... | F16B 5/0635 24/295 |
| 2008/0028577 A1* | 2/2008 | Soman | ................. | F16B 21/075 24/293 |
| 2019/0195262 A1* | 6/2019 | Iwahara | ................... | F16B 5/06 |

* cited by examiner

ARROWHEAD FASTENER CLIP WITH BARBS

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, door panel, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These conventional fastener devices provide approximately relatively equal levels of insertion and extraction force. These body panels often attach to the chassis of an automobile with a relatively high level of insertion force while providing a relatively low level of extraction force.

Fastener clips, such as two-piece fasteners (multi-piece), are known for attaching body panels to an automobile chassis. Two-piece fasteners are used so that if the panels are removed after original installation, such as to service the components in the door, they may be pulled apart so that one portion remains attached to the sheet metal while the other remains attached to the trim panel. The two pieces may also be reattached after separation. However, two-piece fasteners require manufacturing of multiple pieces and labor-intensive assembly of the two pieces and thus are relatively expensive.

One-piece fasteners are typically less expensive than two or multi piece fasteners. One-piece fasteners have a base to attach to a body panel and a blade attached to the base and wings attached at least to the top of the blade at a tip of the fastener for fastening to a frame slot. However, if the frame slot and the fastener are misaligned then the forces on the wings are unequal since the wing closest to the slot edge will experience higher wing compression while the other wing will have insufficient springing force to engage the slot. As the clip is forced into the slot, such high forces on one wing may cause the wing to break off thus rendering the fastener incapable of fastening the body panel to the frame. Worse, the broken, damaged or weakened wing can cause detachment of the body panel or contribute to rattles.

The wings of conventional fasteners have a sharp, unsmooth groove to engage the edge of the frame slot. When the clip is removed however, the sharp edges of the frame slot cut into the softer plastic and cut the groove. During manufacture, the slots are typically formed in the frame of the vehicle, such as in an inner roof or door sheet metal structure, by punching the sheet metal. As the punch enters the sheet metal, the outer part of the sheet metal is pushed toward the inside and a metal puncture or ridge is formed on the inside of the sheet metal. The resulting slot edge on the outer part of the slot is relatively smooth; however, the inner part of the slot edge is sharp and rough. Upon removal of the fastener clip, the sharp edges of the frame cut off the groove so that the clip may not be reinserted and reusable.

If the slot is off-center or if the sheet metal varies in thickness or if tolerances in production of the slot in the vehicle chassis or in the trim-piece exist, for example, then engagement of one portion of the slot in the chassis with one of the wings may not provide suitable frictional engagement. Twisting of the body panel will be likely more prevalent because less than all contact points are actually made with the slot of the vehicle chassis. As a result, conventional single piece fasteners do not self-align themselves when the fastener and the body panel are misaligned and are prone to wing breakage such that the fastener cannot be re-attached.

Conventional fasteners typically do not adequately secure the panel to the vehicle chassis having variations in slot size and location or sheet metal with different curvature or thicknesses throughout. Conventional single piece fasteners do not self-align themselves when the fastener and the body panel are misaligned and are prone to wing breakage such that the fastener cannot be re-attached. Also, conventional fasteners are not suitable when subjected to a variety of environmental conditions, such as in the presence of vibration at various levels of amplitude and frequency. For example, conventional fasteners of this type typically do not prevent or minimize the amount of buzzing, rattling or any other type of noise that may cause attention to the occupants of the vehicle or otherwise weaken the attachment. Conventional fasteners do not adequately accommodate various levels of production tolerances, such as various dimensions amongst, for example, the body panels as well as the vehicle chassis. Thus, conventional fastener devices typically do not self-align nor adequately fasten to a range of sheet metal thicknesses and do not minimize or eliminate buzzing and rattling and do not sufficiently accommodate variations in production tolerances. As a result, wear, squeaks, rattles, buzzing, corrosion and loss of elasticity and loss of sealing may result, especially after years of vehicle operation and exposure to vibration, heat, humidity, and other environmental conditions.

B. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

Figure 1:
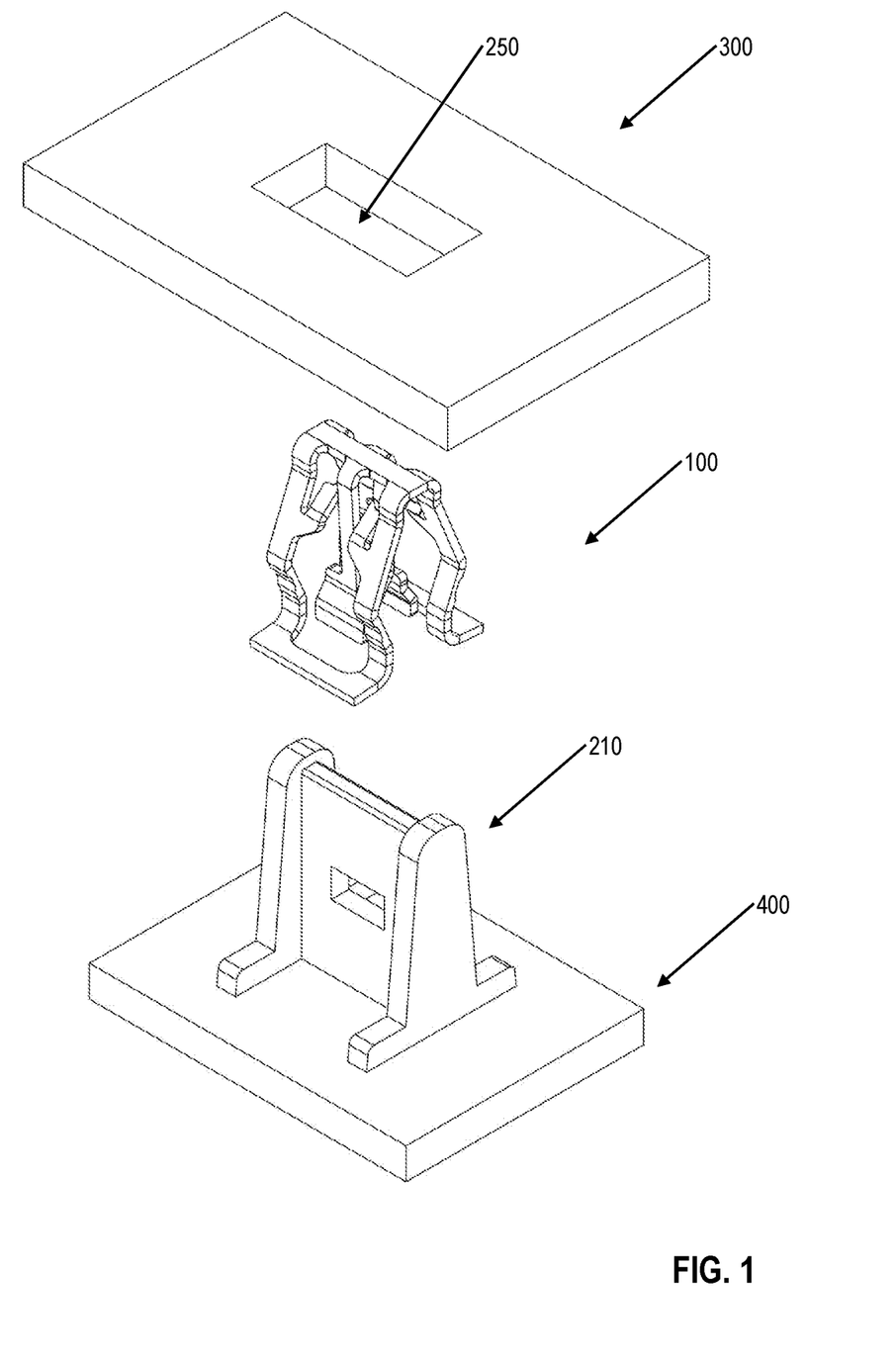
FIG. 1 is a perspective view of a fastener clip assembly, in accordance with some embodiments.

FIG. 1 is a perspective view of a fastener clip assembly, in accordance with some embodiments.

In some embodiments, fastener clip 100 is configured to fasten together top surface 300 and bottom surface 400. Blade 210, which extends from surface 400, is configured to receive fastener clip 100. In some embodiments, blade 210 may be molded onto surface 400. In other embodiments, blade 210 may be attached to surface 400 using various other means.

In some embodiments, fastener clip 100 may also be configured to be inserted through slot 250 of top surface 300 and to secure itself to the top surface 300. In some embodiments, the fastener clip assembly is configured to fasten together top surface 300 and bottom surface 400.

In some embodiments, surface 400 may be part of an automobile body panel and surface 300 may be part of the chassis of an automobile frame. Accordingly, the fastener clip 100 assembly may be configured to fasten together a panel to the frame of an automobile.

Figure 2:
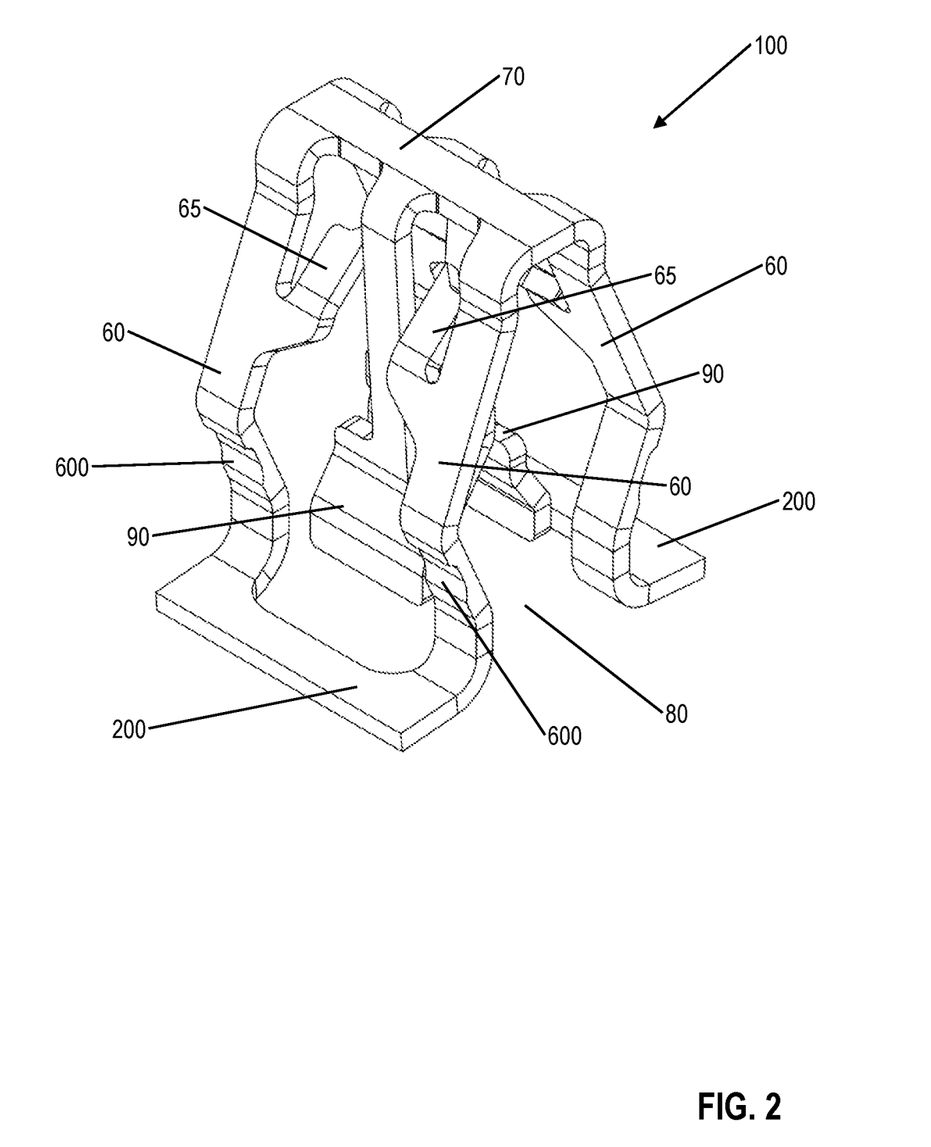
FIG. 2 is a perspective view of a fastener clip, in accordance with some embodiments.

FIG. 2 is a perspective view of a fastener clip, in accordance with some embodiments.

Figure 3:
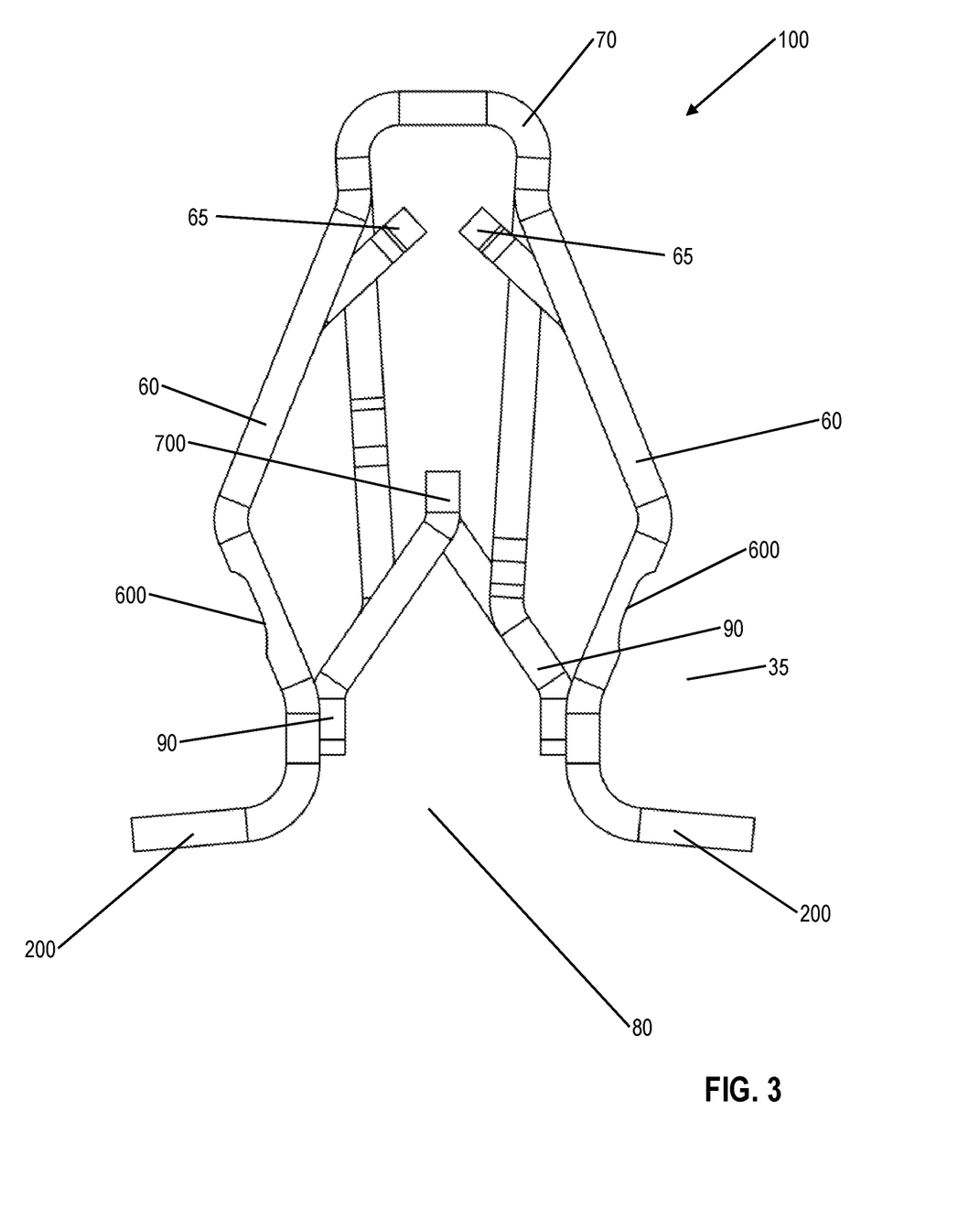
FIG. 3 is another perspective view of a fastener clip, in accordance with some embodiments.

FIG. 3 is another perspective view of a fastener clip, in accordance with some embodiments.

In some embodiments, fastener clip 100 includes two pairs of laterally offset legs 60 joined at a head portion 70. The pairs of legs 60 form a clip opening 80 at an opposite end of the head portion 70 to allow entry of the blade 210 to which clip 100 is configured to attach. In some embodiments, each pair of legs 60 may be connected at the end opposite to head portion 70 via feet 200. Feet 200, for example, may offer additional stability to the clip 100 by coupling together each pair of legs 60. In some embodiments, feet 200 may also serve as a stopping point for how far fastener clip 100 may be inserted into slot 250. The stopping point may be determined by when the feet 200 engage surface 300.

According to the embodiments shown, one or more of arms 90 extend down from the head portion 70 between legs 60. According to other embodiments, two or more arms 90 may extend from head portion 70. In alternative embodiments, arms 90 may be attached directly to arms 60.

In some embodiments, fastener clip 100 may also include one or more barbs 65 (four in some embodiments). In some embodiments, once of each of barbs 65 may be each attached to one of each of the legs 60 as shown in the figure.

In some embodiments, fastener clip 100 may be manufactured using a material with hardness that is greater than the hardness of the material of the blade 210. For example, in some embodiments, the fastener clip 100 may be made out of metal, and the blade 210 may be made out of plastic.

Based at least on barbs 65 having sharp ends and on barbs 65 being of greater hardness than the blade, the barbs, in some embodiments, are configured to dig into blade 210, attaching the fastener clip 100 blade 210 based at least upon inserting the fastener clip 100 over the blade 210.

In some embodiment, upon inserting fastener clip 100 over blade 210, the blade 210 is configured to push arms 90 apart. During insertion, blade 210 slides upwards towards barbs 65, which are also pushed part by blade 210. The top of blade 210 is configured to stop at head portion 70.

In some embodiments, one or more projections 700 (knuckles) may originate from each corresponding arm 90 and may be configured to engage a corresponding opening on blade 210 based at least upon the clip 100 being inserted fully over blade 210. Arms 90 are configured to spring back based at least upon projections 700 reaching the opening on the blade 210. Accordingly, projections 700 are configured to engage a top portion of the opening on the blade 210 to contribute in preventing the clip 100 from disengaging blade 210.

In addition, upon inserting the clip 100 over blade 210, barbs 65 are configured to dig into the material of blade 210 to further increase the removal effort required to separate the clip from the blade. Furthermore, barbs 65 provide additional support, preventing undesired relative movement between the fastener clip 100 and the blade 210.

In some embodiments, projections 700 may have any suitable length or may be at different distances away from arms 90 and/or at different angles. For example, different angles may be used depending on the desired extraction force for the clip/blade pair. Further, the projections 700 may take the form of a hook, a loop, a prong, stair steps, ribs and may even interlock (with each other) and/or have any suitable form or shape. Arms 90 and/or projections 700 may further be located in any position and in any direction in order to further provide additional support to prevent undesired relative movement between the clip and the blade.

In some embodiments, arms 90 may be configured to move substantially independently from the pair of legs 60. According to one embodiment, a length of the pair of arms 90 is substantially the same as a length of the pair of legs 60, such that the insertion force of the blade 210 is substantially independent from an engagement of the legs 60 within slot 250 of surface 300 (on an automobile chassis, for example). For example, the insertion and/or withdrawal force of the blade 210 and arms 90 may be substantially independent from the insertion and/or withdrawal force of legs 60 and slot 250.

In some embodiments, each leg 60 may include at least one depressed portion 600. The depressed portion 600 is formed and is configured to engage a portion of the slot 250 of surface 300. In some embodiments, slot 250 may have any shape such as a circle, a square, a rectangle, a pentagon, a hexagon, a polygon, an n-sided polygon where n is a whole number, an ellipse, an oval, etc.

In some embodiments, the depressed portion 600 may include, for example, an abrupt edge, a gradual angled edge, such as a curve, a single angled edge, a discrete multiangled edge or a pointed edge. The depressed portion 600 may be formed on the depressed portion 600 of each leg 60 so as to engage the slot 250 to increase an extraction force for the fastener clip 20 from the slot 250. The depressed portion 600 may be sized to suitably engage slot 250 of the first engagement structure 30 in order to obtain the desired level of extraction force. According to one embodiment, the depressed portion 600 may be a depression formed on legs 60. For example, the depressed portion 600 may be formed by stamping legs 60 to form the depressed portion 600. The size and shape of the depressed portion 600 may be formed in any suitable manner in order to permit a relatively easy insertion of the fastener clip 20 into the slot 250 while increasing the extraction force.

Figure 4:
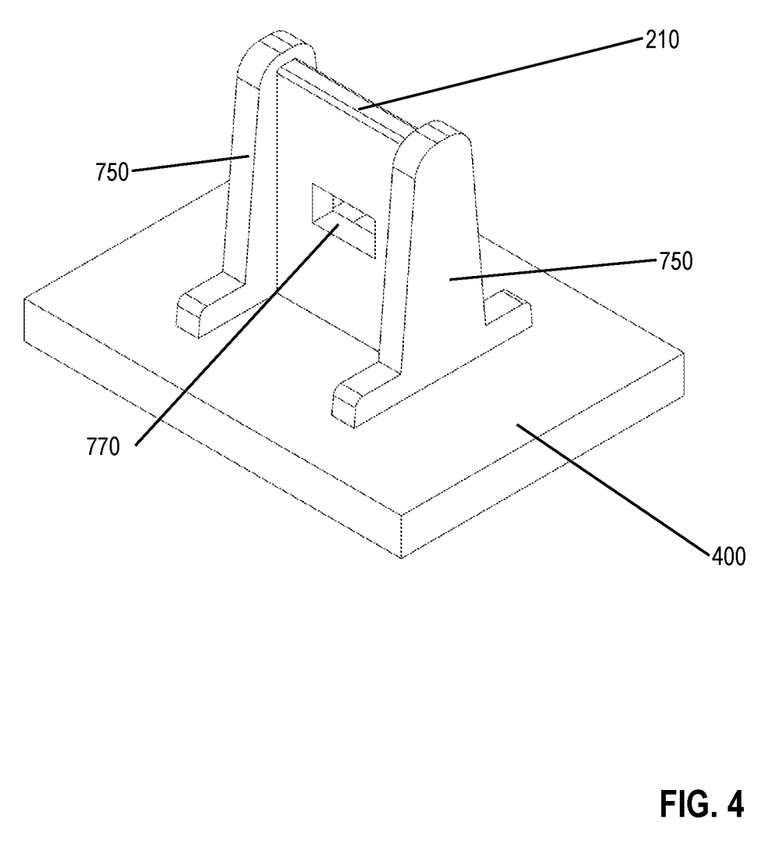
FIG. 4 is a perspective view of a blade configured to receive a fastener clip, in accordance with some embodiments.

FIG. 4 is a perspective view of a blade configured to receive a fastener clip, in accordance with some embodiments.

In some embodiments, blade 210 is configured to receive and attach to fastener clip 100. Blade 210 may be either attached to or be part of surface 400. In embodiments where surface 400 is made of plastic, for example, the structure of blade 210 may be molded as part of surface/structure 400. In some embodiments, surface/structure 400 may be an automobile panel that is to be attached to the automobile chassis.

In some embodiments, guiding structures 750, positioned on either side of blade 210, are configured to guide fastener clip 100 over blade 210 as the fastener clip is being inserted over the blade. In addition, guiding structures 750 are configured to provide additional stability to the coupling between blade 210 and fastener clip 100 after installation.

In some embodiments, projections 700 of fastener clip 100 are configured to engage opening 770 of blade 210. Arms 90, to which projections 700 are attached in some embodiments, are configured to spring out as the fastener clip is being inserted over blade 210 and then spring back as projections 700 reach opening 770, thereby, in some embodiments, engaging the opening 770. In some embodiments, projections 700 are configured to engage a top inner surface of the opening when an extraction force is applied to separate the clip from the blade, thereby preventing the separation of the clip from the blade.

In some embodiments, barbs 65 of fastener clip 100 are configured to "dig" into blade 210 as the fastener clip is being placed over the blade. In some embodiments, the fastener clip 100 (and barbs 65) may be made of a material that has hardness that is sufficiently greater than the hardness of the materials used for blade 210. As such, barbs 65 are configured to dig into blade 210 as the fastener clip is being placed over blade 210. In some embodiments, barbs 65 are configured to provide additional resistance force when the clip is being forced off the blade. In addition, barbs 65 are configured to provide additional overall stability to the coupling between the clip and the blade by providing, in some embodiments, four additional support points between the two devices. Such additional stability may be useful in repeated insertions and removals of the fastener clip assembly into and out of a slot in a chassis, for example.

Figure 5:
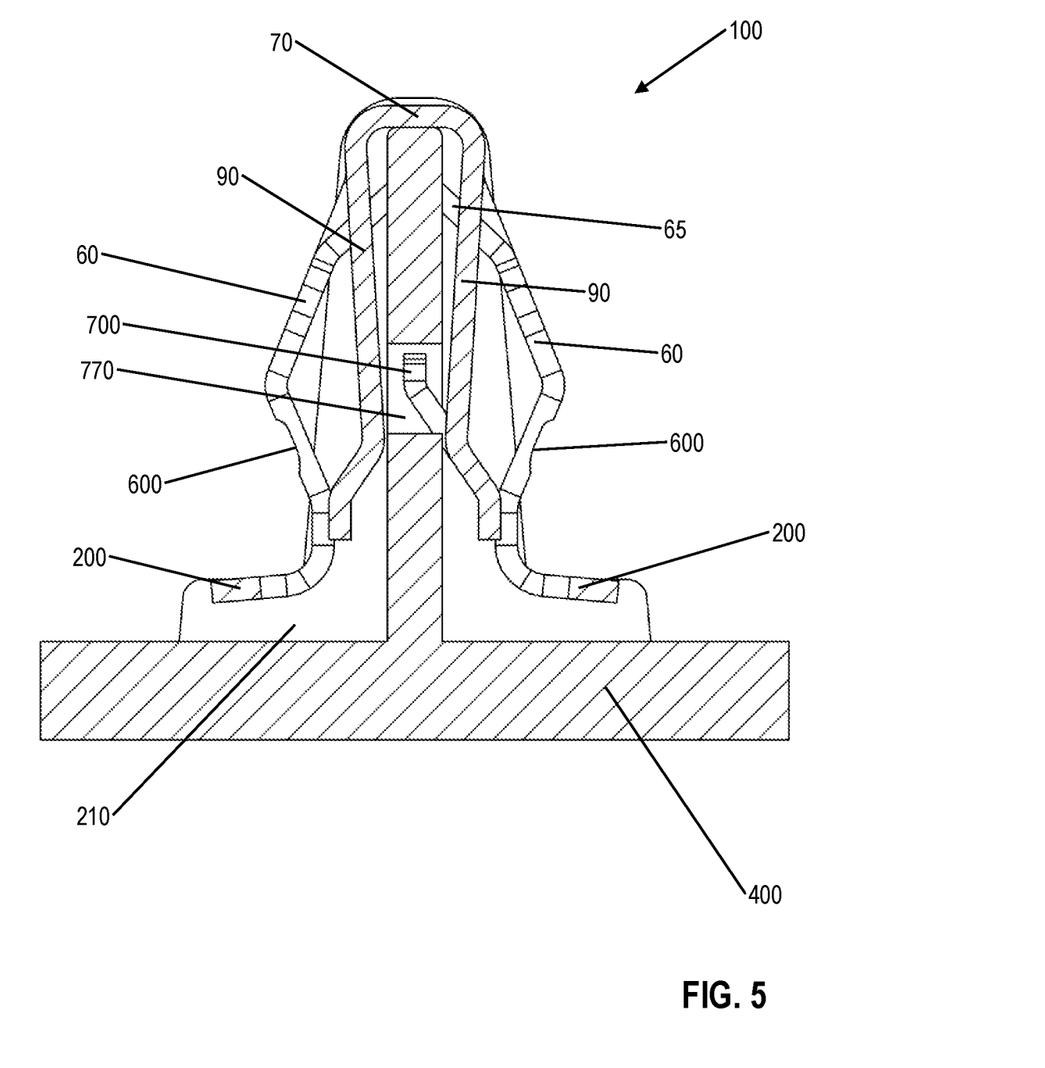
FIG. 5 is a perspective view of a fastener clip, in accordance with some embodiments.

FIG. 5 is a perspective view of a fastener clip, in accordance with some embodiments.

Figure 6:
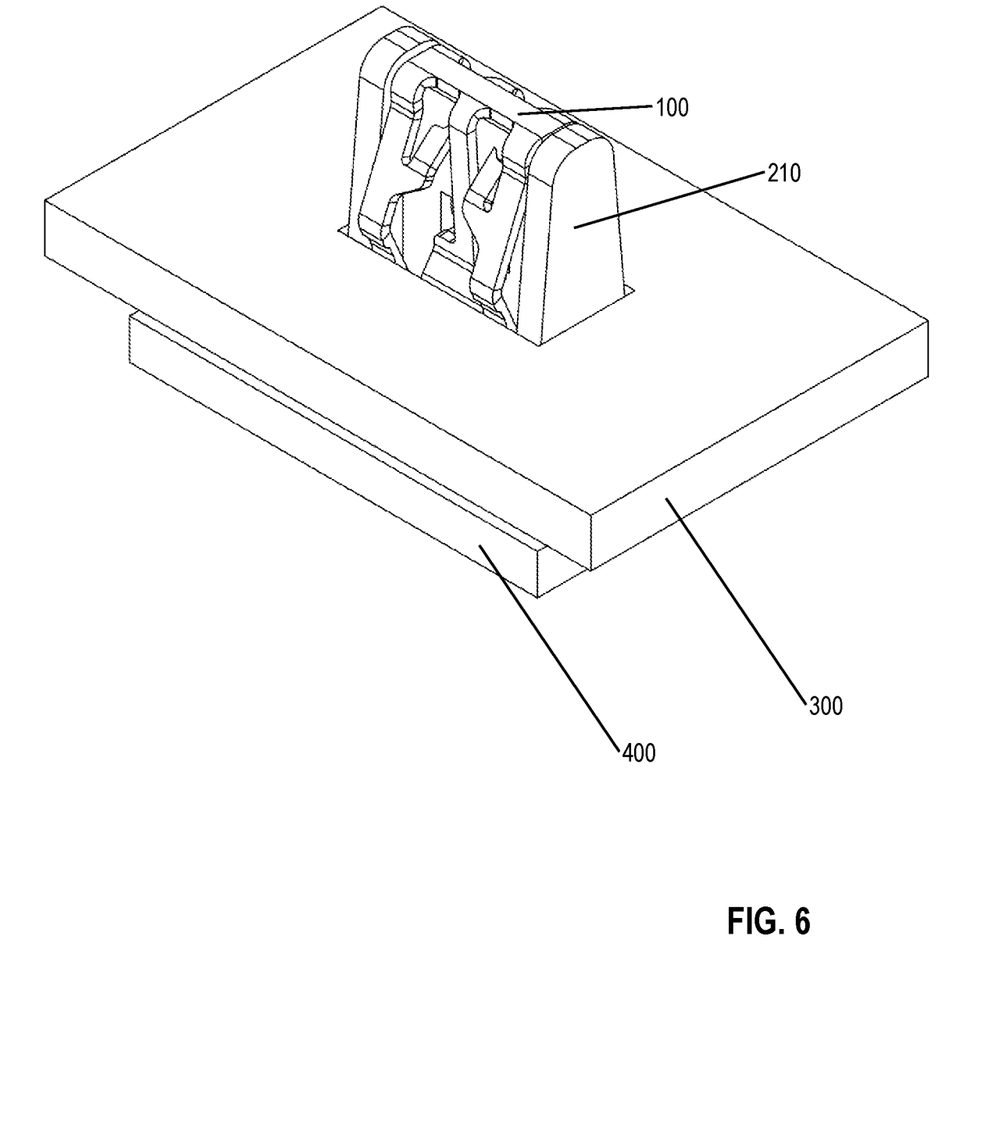
FIG. 6 is another side view of a fastener clip attached to a chassis, in accordance with some embodiments.

FIG. 6 is another side view of a fastener clip attached to a chassis, in accordance with some embodiments.

In some embodiments, the fastener clip assembly is configured to couple two surfaces such as surfaces 300 and 400. Fastener clip 100 is configured to fit over and attach to blade 210, blade 210 being attached to surface 400, and in addition, fastener clip 100 is configured to be removably attach to a slot in surface 200. For example, the fastener clip system may be used to fasten together a body panel to the chassis of an automobile.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip comprising:
a first pair of legs and a second pair of legs laterally offset from each other and legs joined at a head portion, wherein the first pair of legs and the second pair of legs form a clip opening at an opposite end of the head portion;
a first arm and a second arm& coupled to the head portion, wherein the first arm is between the first pair of legs and wherein the second arm is between the second pair of legs, wherein the first arm and the second arms move substantially independently from the first pair of legs and the second pair of legs;
a first projection and a second projection extending inward respectively from the first arm and second arms, wherein the first projection and the second projections engage an opening in a blade to secure the fastener clip over the blade based at least upon the first projection and the second projection engaging the opening in the blade based at least upon a spring action of the first arm and the second arm, wherein the first projection and the second projection engage on opposite sides of the blade;
a first pair of barbs and a second pairs of barbs coupled respectively to the first pair of legs and the second pair of legs, wherein the first pair of barbs and the second pair of barbs dig into the blade and secure the fastener clip to the blade based at least upon the fastener clip being pushed over the blade.

2. The fastener clip of claim 1, wherein the fastener clip couples a first structure to a second structure based at least upon:
the blade being coupled to the first structure,
the fastener clip engaging and being coupled to a slot in the second structure.

3. The fastener clip of claim 2, wherein the first structure is a body panel and wherein the second structure is a vehicle chassis.

4. The fastener clip of claim 2, comprising depressions in the first pair of legs and in the second pair of legs, wherein the fastener clip engages the slot in the second structure based at least upon the depressions engaging a perimeter of the slot in the second structure.

5. The fastener clip of claim 2, comprising a first foot and a second foot coupled respectively to the first pair of legs and the second pair of legs, wherein the first foot and the second foot stop the fastener clip against the second structure based at least upon fully inserting the fastener clip into the slot of the second structure.

6. A fastener assembly system comprising:
a chassis comprising a slot;
a panel comprising a blade;
a fastener clip comprising:
   a first pair of legs and a second pair of legs laterally offset from each other and joined at a head portion, wherein the first pair of legs and the second pair of legs form a clip opening at an opposite end of the head portion;
   a first arm and a second arm coupled to the head portion, wherein the first arm is between the first pair of legs and wherein the second arm is between the second pair of legs, wherein the first arm and the second arms move substantially independently from the first pair of legs and the second pair of legs;
   a first projection and a second projections extending inward respectively from the first arm and the second arms, wherein the first projection and the second projections engage an opening in the blade to secure the fastener clip over the blade based at least upon the first projection and the second projections engaging the opening in the blade based at least upon a spring action of the first arm and the second arm, wherein the first projection and the second projection are on opposite sides of the blade,
      wherein the fastener clip is secured to the chassis based at least upon the fastener clip being inserted into the slot in the chassis,
   a first pair of barbs and a second pairs of barbs coupled respectively to the first pair and the second pairs of laterally offset legs, wherein the first pair of barbs and the second pair of barbs dig into the blade and secure the fastener clip to the blade based at least upon the fastener clip being pushed over the blade.

7. The fastener assembly system of claim 6, wherein the fastener clip comprises depressions in the first pair of legs and in the second pair of legs, wherein the fastener clip engages the slot in the chassis based at least upon the depressions engaging a perimeter of the slot in the chassis.

8. The fastener assembly system of claim 6, wherein the fastener clip comprises a first foot and a second foot coupled respectively to the first pair of legs and the second pair of legs, wherein the first foot and the second foot stop the fastener clip against the chassis based at least upon fully inserting the fastener clip into the slot of the chassis.

* * * * *